(12) United States Patent
Laird (10) Patent No.: US 7,234,417 B2
(45) Date of Patent: Jun. 26, 2007

(54) TETHERING DEVICE

(76) Inventor: Amos Wilfred Laird, 25 Tombs Court, Bullsbrook WA 6084 (AU)

( * ) Notice: Subject to any disclaimer, the term of this patent is extended or adjusted under 35 U.S.C. 154(b) by 344 days.

(21) Appl. No.: 10/490,919

(22) PCT Filed: Sep. 28, 2001

(86) PCT No.: PCT/AU01/01235

§ 371 (c)(1),
(2), (4) Date: Aug. 20, 2004

(87) PCT Pub. No.: WO02/28170

PCT Pub. Date: Apr. 11, 2002

(65) Prior Publication Data

US 2005/0011471 A1    Jan. 20, 2005

(51) Int. Cl.
*A01K 3/00* (2006.01)
(52) U.S. Cl. .................................... 119/61.57; 119/791
(58) Field of Classification Search ............... 119/61.5, 119/786, 787, 788, 791, 61.57; 114/230.1, 114/230.26; 52/158, 165
See application file for complete search history.

(56) References Cited

U.S. PATENT DOCUMENTS

| | | | |
|---|---|---|---|
| 642,567 A | 2/1900 | Arsneau | |
| 2,437,786 A | 3/1948 | Oberdorf et al. | |
| 2,484,263 A * | 10/1949 | Atkinson | 119/61.57 |
| 2,725,853 A | 12/1955 | Nordheim | |
| 3,088,438 A | 5/1963 | Oliphant | |
| 3,123,052 A | 3/1964 | Marshall | |
| 3,286,962 A | 11/1966 | Warth | |
| 3,381,763 A * | 5/1968 | Matson | 173/91 |
| 4,101,088 A * | 7/1978 | Stauth | 242/396.1 |
| 4,459,787 A * | 7/1984 | Wilcox | 52/155 |
| 4,546,730 A * | 10/1985 | Holland | 119/780 |
| 4,796,566 A | 1/1989 | Daniels | |
| 4,960,064 A * | 10/1990 | Mestas et al. | 114/230.26 |
| 5,022,351 A | 6/1991 | Daniels | |
| 5,613,458 A * | 3/1997 | Owen | 114/230.1 |
| 5,699,864 A * | 12/1997 | Dvorak et al. | 173/91 |

* cited by examiner

*Primary Examiner*—Robert P. Swiatek
(74) *Attorney, Agent, or Firm*—Michael Best & Friedrich LLP (57) ABSTRACT

A tethering device (10) comprising a support member (12) and a rotatable member (14) rotatably mounted on the support member (12) and about which a flexible tether line (16) can be wound for tethering an animal or object to the support member (12).

20 Claims, 10 Drawing Sheets

TETHERING DEVICE

FIELD OF THE INVENTION

This invention relates to a tethering device.

This invention has been devised particularly although not solely for the tethering of animals.

BACKGROUND ART

The use of animal tethering devices is known in the prior art. Animal tethering devices are used to restrain animals so that their ranges of movement are restricted. These devices typically comprise a flexible member such as a chain or rope which is attached to the animal usually by means of a collar around the neck of the animal.

However, difficulties have been encountered with known tethering devices as a result of the twisting and tangling of the leash. If an animal becomes entangled in the leash the animal's movement is restricted which could result in injury to the animal.

Furthermore, problems have been experienced with known devices in attempting to restrict the precise radius of movement of the animal. This is desirable where it is required to restrict the particular area of grazing of an animal for example to concentrate grazing in one area of a field or garden.

A further disadvantage of previously known tethering devices is that they are large and unwieldy and difficult to set up and take down. Furthermore, many of these devices require another implement such as a hammer to drive them into the ground. Thus, a device which may be easily driven into and taken out of the ground without the need for another implement is desirable.

It is an object of the present invention to overcome at least one of the above difficulties.

DISCLOSURE OF THE INVENTION

According to one aspect of the present invention, there is provided a tethering device comprising;

a support member having an upper section and a lower section, the upper section being slidably mounted on the lower section and arranged to reciprocate with respect to the lower section to impart a driving force to the lower section for either driving the lower section into the ground or extracting the lower section from the ground, and a rotatable member rotatable about the support member and about which a flexible tether line can be wound for tethering an animal or object to the support member.

Preferably, the lower section incorporates a head and the upper section includes upper and lower striking surfaces on opposed sides of the head.

More preferably, the head comprises an upper face and a lower face, the body of the head being tapered towards the upper face and towards the lower face.

The rotatable member is conveniently in the form of a reel or spool and is preferably removably supported on the support member. The rotatable member may abut a spacer on the support member to support the rotatable member away from the ground.

The tethering device may further comprise a limiting means for limiting the length of the flexible member when extended from the rotatable member. The limiting means is conveniently mounted on the opening in the rotatable member. The limiting means may be in the form of a locking means such as a pin or clamp. The device may also comprise a guard means in association with the locking means to protect the animal from injury by the locking means. The presence of the guard means also assists in preventing tangling of the tether line around the locking means.

The tether line may be provided with at least one aperture which can engage the flexible member to prevent further extension thereof from the rotatable member. Typically, the tether line may be provided with multiple apertures along the length of the line to form locking holes. The locking means may be adapted to be located in one of the locking holes to secure the tether line to the rotatable member. In this way the length of the tether line can be adjusted thereby allowing a precise determination of the radius of movement of the animal. Typically the tether line comprises a chain wherein the links of the chain define the various apertures.

The rotatable member may also be provided with at least one opening in which the locking means may reside to assist in further securing the tether line to the rotatable member.

The tethering device may be further provided with an attachment means for securing the locking means during unwinding of the tether line. The attachment means is typically a hook to which a portion of the locking means may be affixed to retain the locking means out of engagement with the tether line.

The support member may be formed in two sections, an upper section and a lower section, the upper section being slidably mounted on the lower section whereby the upper section can be reciprocated with respect to the lower section to impart a driving force to the lower section for either driving the lower section into the ground or extracting the lower section from the ground.

The lower section preferably incorporates a head and the upper section preferably includes upper and lower striking surfaces on opposed sides of the head. In this way when the lower section is to be driven into the ground the upper striking surface can strike a face on the head to apply a downward force to the lower section. When removing the support member from the ground, the lower striking surface can strike a face of the head to apply an uplifting force to the lower section.

The head preferably comprises an upper face and a lower face, the body of the head being tapered inwardly towards the upper face and the lower face. The provision of a tapered head assists in ease of movement of the head within the upper section.

The upper section preferably comprises a first section, a second section and an intermediate section, the intermediate section being located between the first section and the second section, the first section being located at an end of the upper section remote from the stake when the device is in the assembled form. During assembly of the upper section, the first section, the second section and the intermediate section are welded together to form the upper section with the first section being located at the upper end of the upper section furthermost from the ground when in use. The second section is preferably of heavier mass than the first section to assist in stablisation of the tethering device when in the ground.

It is preferable that the upper section of the support member is not only slidably mounted on the lower section but that it is also rotatably mounted on the lower section. This rotatable movement assists in preventing tangling of the tether line and together with the rotation of the rotatable member about the support member provides a double anti-tangle system.

The lower section may further comprise an upper part and a lower part. The upper part may comprise the head, with an upper face and a lower face on opposed sides of the head. The lower part may comprise a stake section.

The stake section comprises a shank and a pointed section at one end of the shank for location in the ground.

The tethering device may also comprise a receptacle for retaining water or food (or both) for the animal. The receptacle is conveniently bowl shaped and is mountable on the support member. The receptacle is preferably mounted on the upper portion of the support member. The rotatable member which is positioned on the intermediate portion as previously discussed may include a second collar which abuts the receptacle when the device is assembled. The second collar allows the receptacle to be retained at a distance away from the rotatable member.

The receptacle may be provided with an adjusting means to allow for raising or lowering of the height of the receptacle, the adjusting means being preferably in the form of a twist nut arrangement. One or more further receptacles may be provided on the support member. In this way, food and water for the animal may conveniently be provided in separate receptacles.

For the tethering of lambs or other suckling animals, the receptacle may be provided with a teat or teats from which the suckling animal may drink. Alternatively, a separate fitting may be provided on the tethering device for attachment of a bottle or container fitted with a teat to allow the suckling animal to drink.

The tethering device may also be fitted with further features. For example a shade cover or umbrella may be fitted on the upper portion of the support member to provide shade protection for the animal. In this case, the tethering device may be conveniently provided with a bracket to retain the shade cover or umbrella.

The tethering device may be easily located in the ground by raising the upper section of the support member and bringing this down on the lower section to provide a driving force to the lower section. Once the support member is located in the ground the rotatable member and other components such as the receptacle may be positioned on the support member. When the device requires removal from the ground, a reverse procedure is followed. As can be seen, great physical strength is not required to assemble or to disassemble the device.

Since the tethering device consists of a number of components, it is less bulky, can be readily transported and may be easily assembled.

BRIEF DESCRIPTION OF THE DRAWINGS

The invention will be better understood by reference to the following description of one specific embodiment thereof as shown in the accompanying drawings in which.

BEST MODE(S) FOR CARRYING OUT THE INVENTION

The embodiment is directed to a tethering device for tethering animals.

Referring to the drawings, the tethering device generally referred to by numeral 10 comprises a support member 12 and a rotatable member in the form of a spool 14. A tether line in the form of a chain 16 is wound around the spool 14. A clasp 28 for attachment to a collar of the animal is provided at the end of the chain 16. A locking means 18 is mounted on the spool 14.

Figure 1:
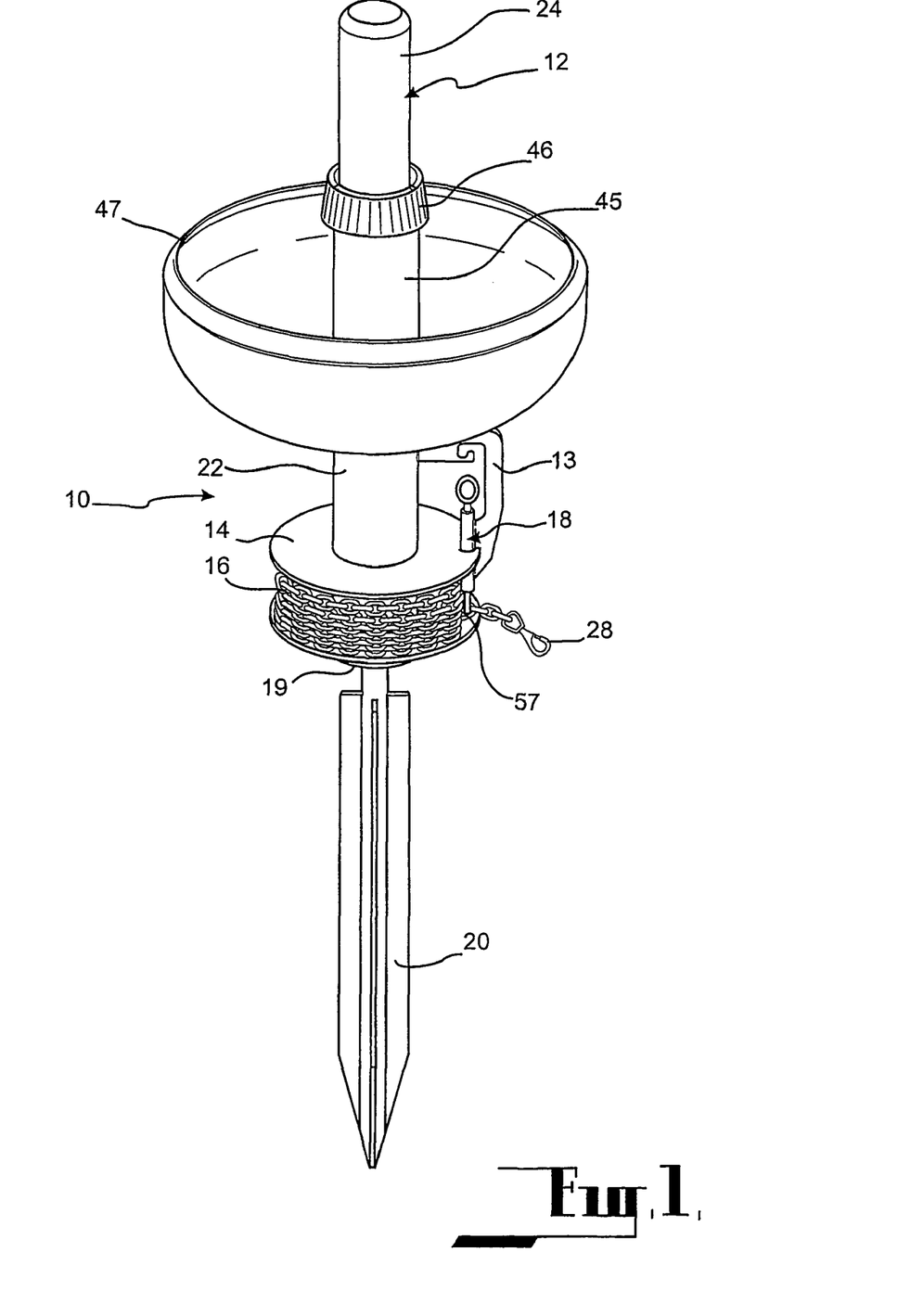
FIG. 1 is a perspective view of a tethering device according to the embodiment.
Figure 2:
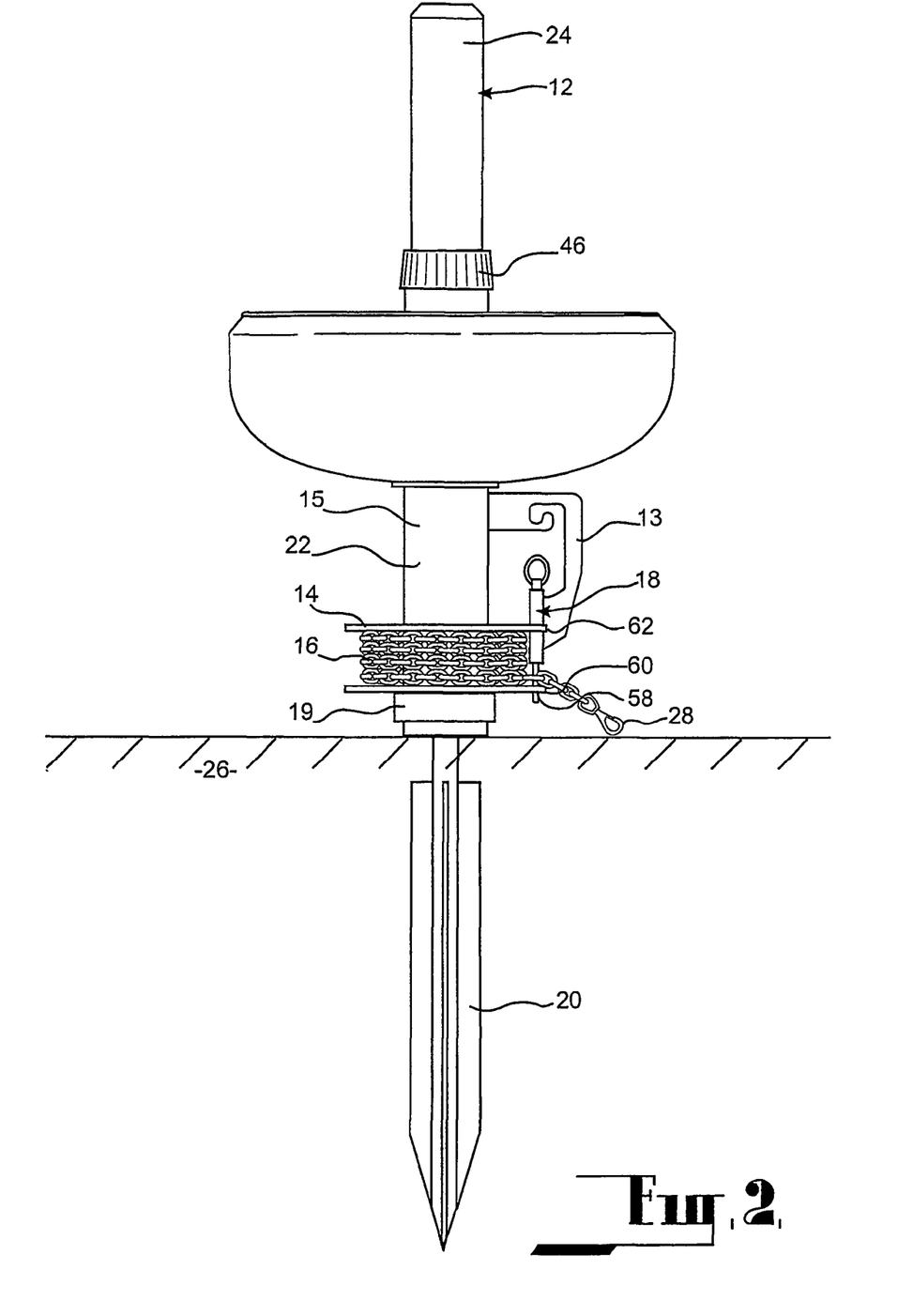
FIG. 2 is a side elevational view of the tethering device positioned in the ground according to the embodiment.

The support member 12 comprises a lower portion 20, an intermediate portion 22 and an upper portion 24. As can be seen in FIG. 2, the lower portion defines a stake 20 adapted to be driven into the ground 26, as will be explained later.

The spool 14 includes a collar 15 which can be slidably received on the support member 12. In addition, the support member 12 is provided with a spacer 19 on the intermediate portion 22 of the support member. As can be seen in FIG. 2, the spacer 19 supports the spool away from the ground 26 thereby assisting in preventing contamination of the spool 14 with dirt.

A guard means 13 is provided in association with the locking means 18 to protect the animal from injury by the locking means. The guard means 13 also assists in preventing tangling of the chain 16 which may occur around the locking means in the absence of the guard means.

Figure 3:
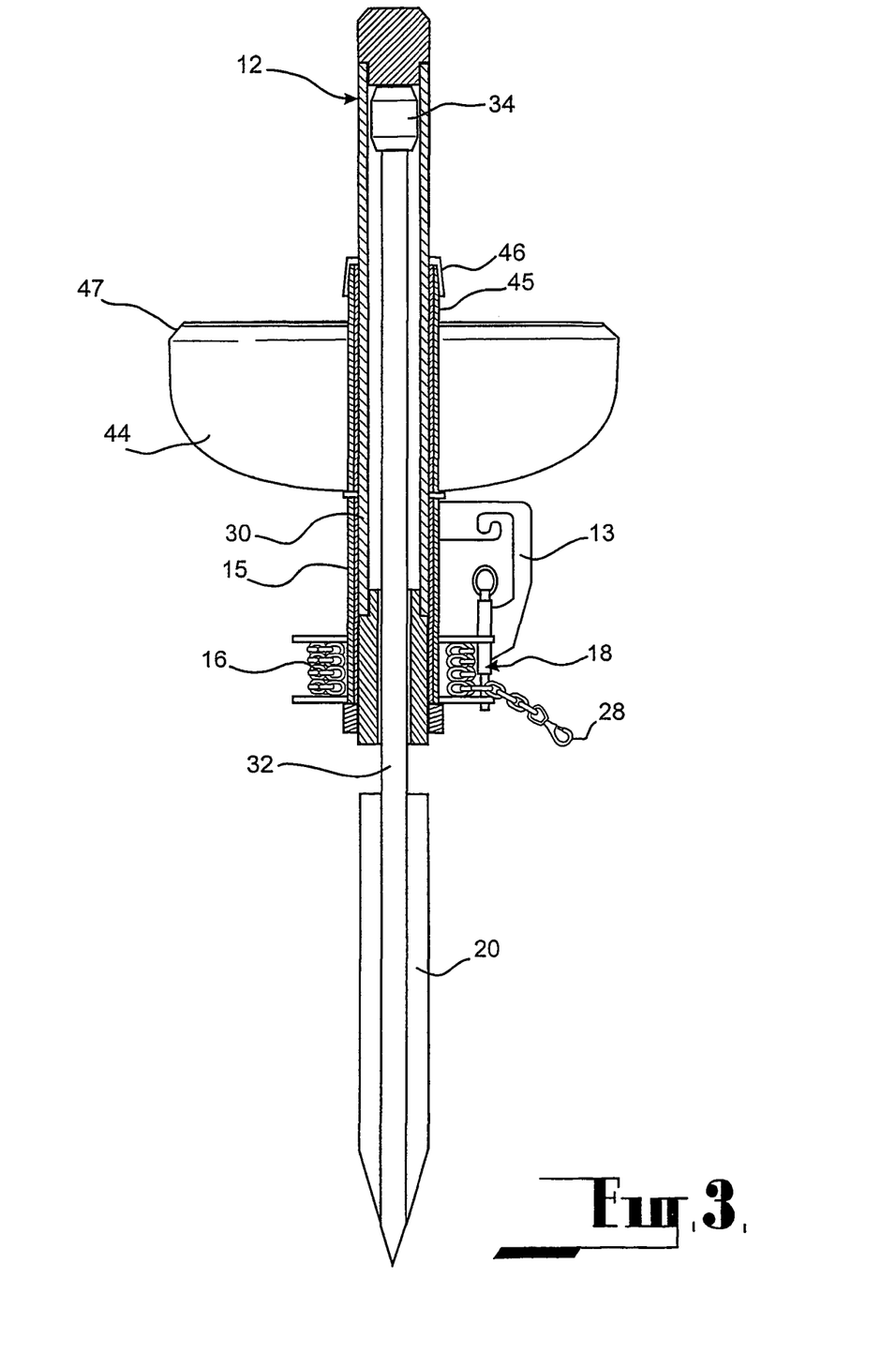
FIG. 3 is a sectional side view of the device shown in FIG. 2.
Figure 5:
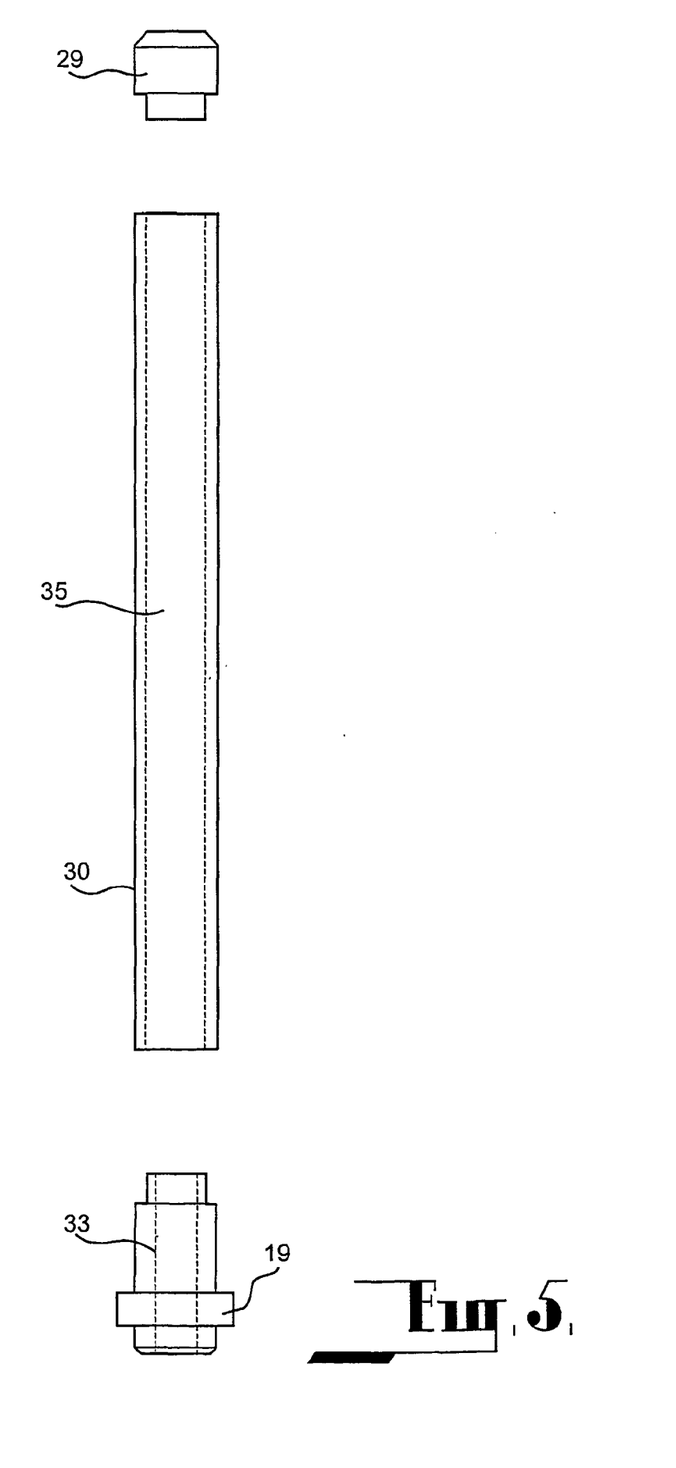
FIG. 5 is a side elevational view of the components of an upper section of the support member of the device shown in FIG. 3.

The support member 12 can be seen in FIGS. 3 and 5 to comprise an upper section 30 slidably mounted over a lower section 32.

Figure 6:
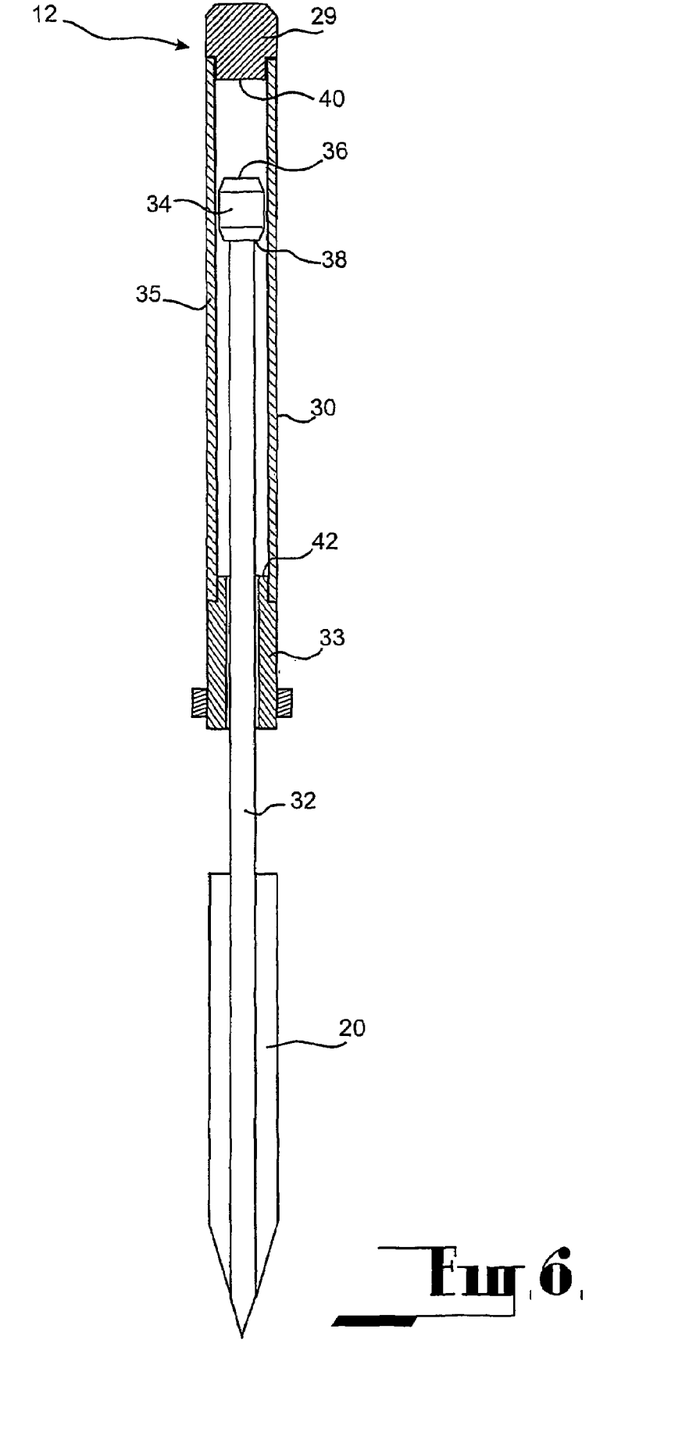
FIG. 6 is a sectional side view of the support member of the device according to the embodiment.
Figure 7:
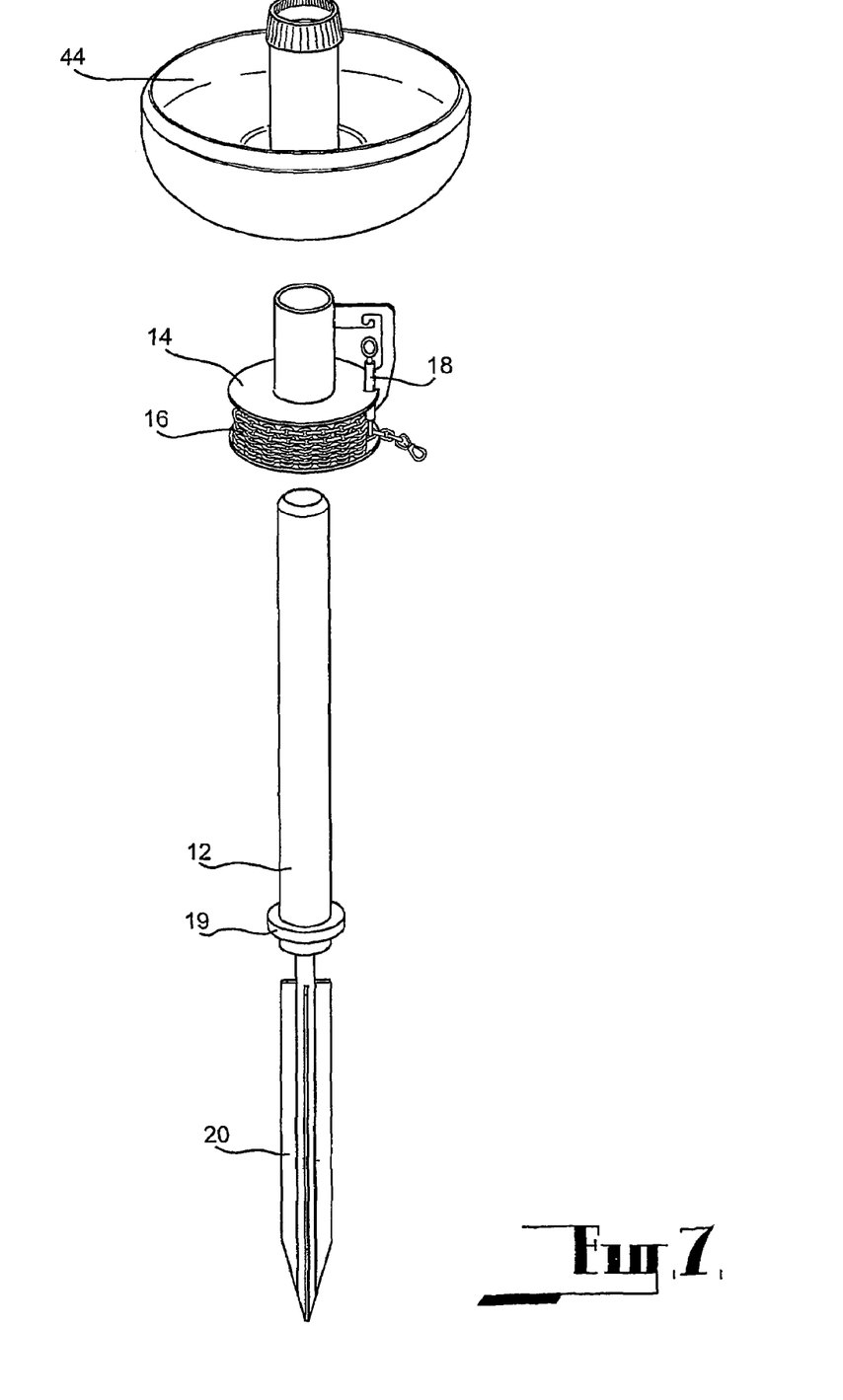
FIG. 7 is a perspective view of the device of FIG. 1 showing the separate components of the device.
Figure 8:
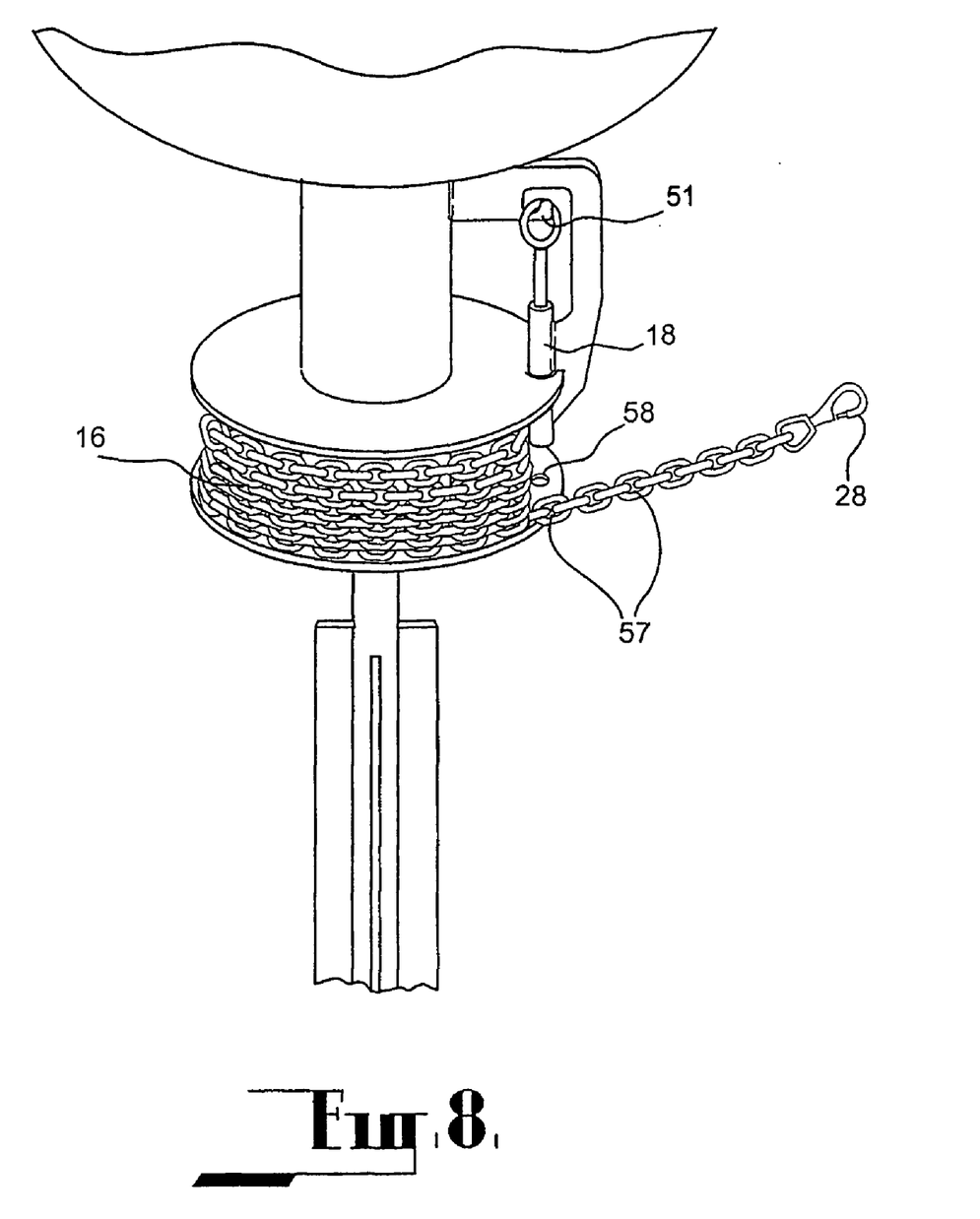
FIG. 8 is a perspective view of a portion of the device according to the embodiment showing the locking means and the attachment means.

The lower section 32 includes an upper part consisting of a head 34. The head 34 comprises an upper face 36 and a lower face 38. As can be seen in FIG. 6, the head 34 is tapered from the body of the head towards the upper face 36 and lower face 38. This tapering assists in ease of movement of the head section within the upper section 30.

The lower section 32 incorporates the stake 20.

Figure 4:
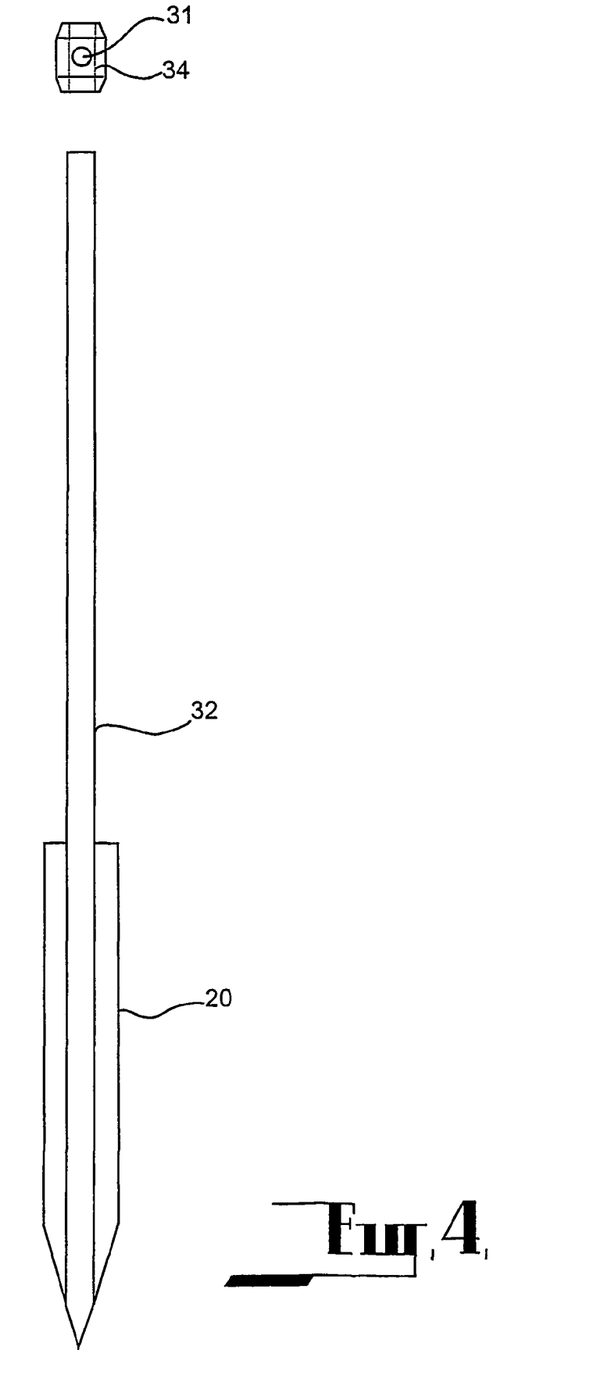
FIG. 4 is a side elevational view of the components of a lower section of the support member of the device shown in FIG. 3.

Assembly of the components of the support member will now be explained. As can be seen in FIG. 4, the lower section 32 is formed by welding the head 34 to the lower section 32. Prior to welding, the second section 33 of the upper section is slid over the upper part of the lower section 32. The lower section 32 and the head 34 are welded together through holes 31 on opposing sides of the head, the welding material filling the holes on completion of the welding. Welding through holes 31 allows an even unwelded surface to be presented at upper face 36 and lower face 38.

The components which are welded together to form the upper section 30 are shown in FIG. 5. A first section 29 is welded onto the upper end of intermediate section 35 forming a sleeve which is placed over the already welded lower section 32 to enclose the head 34 leaving the second section 33. The second section 33 is then moved to align with the open end of intermediate section 35 and the two sections are welded together to form the support member 12 as shown in FIG. 6.

The upper section 30 comprises an upper striking surface 40 and a lower striking surface 42.

The device 10 further comprises a receptacle 44 which is detachably mountable on the support member 12. The receptacle 44 includes a mounting collar 45 slidably and rotatably receivable on the upper portion 24 of the support member 12, and securing means in the form of a twist nut 46. The receptacle 44 has a lip 47 which is bevelled inwards to assist in preventing spillage from the bowl. The receptacle 44 is height adjustable by means of the twist nut 46 and can be filled with food and/or water for the animal.

Figure 9:
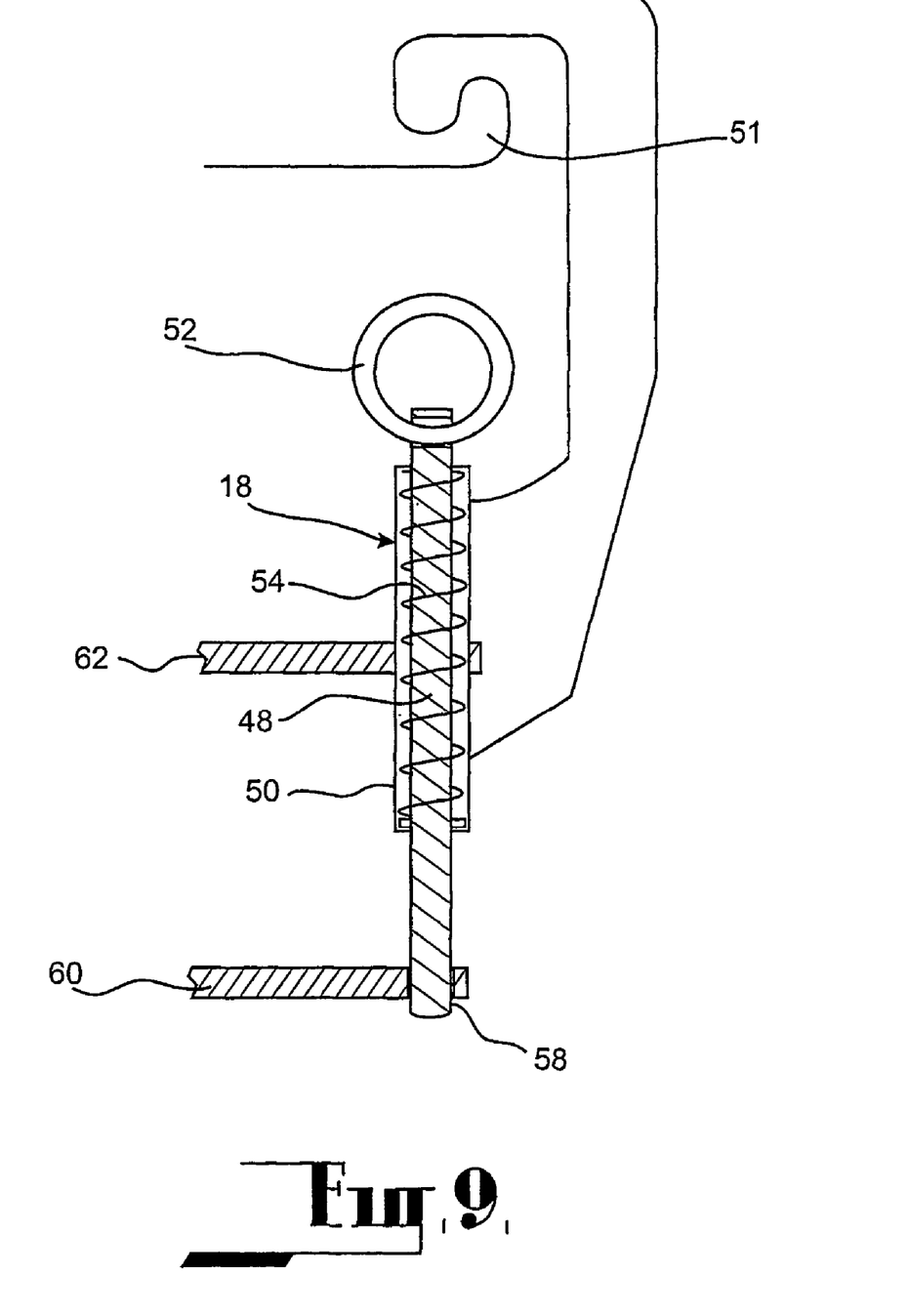
FIG. 9 is a sectional view of the locking means and the attachment means of the device according to the embodiment.
Figure 10:
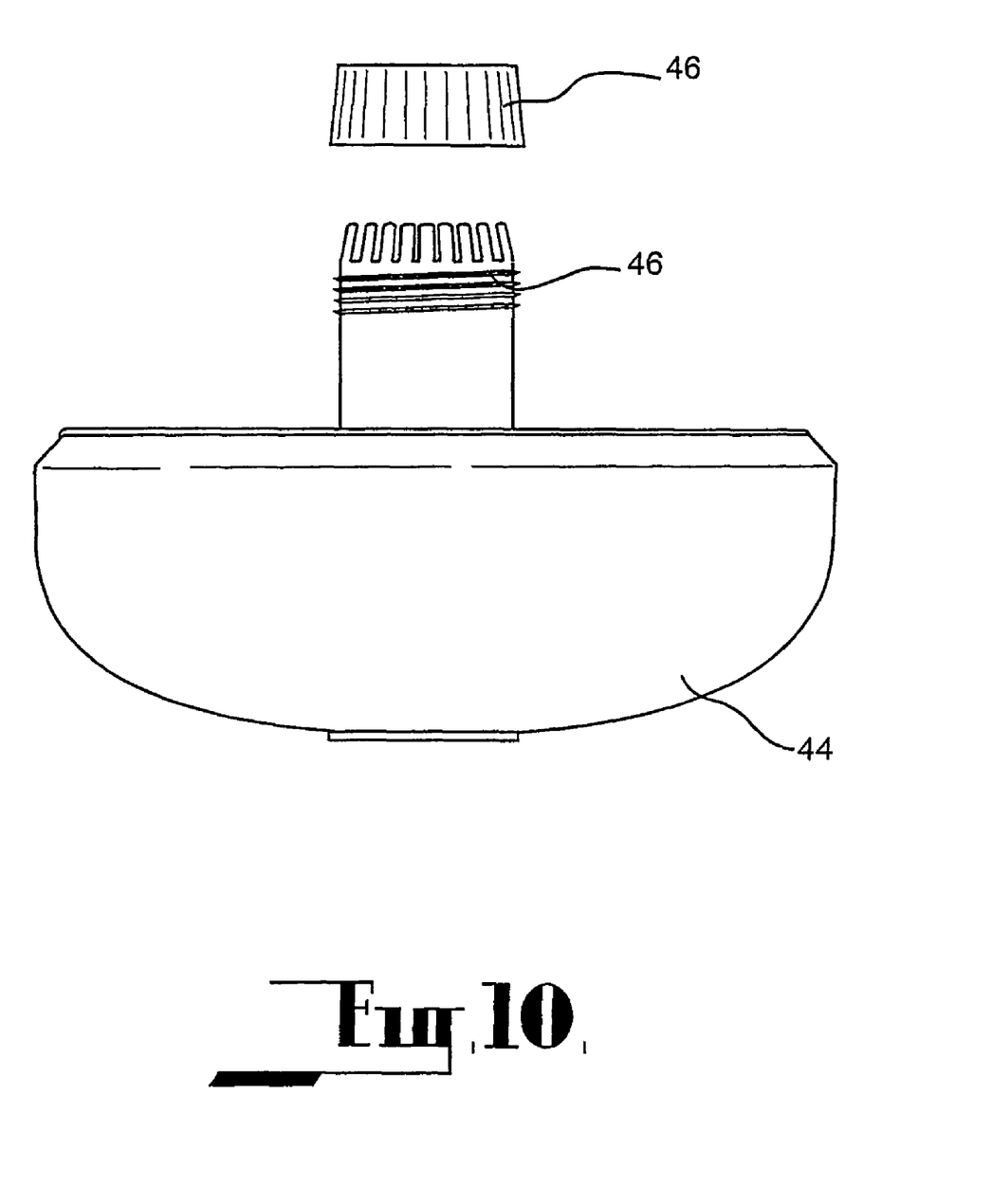
FIG. 10 is a side elevational view of the receptacle and securing means of the device according to the embodiment.

The locking means 18 is in the form of a locking pin, the main body of which passes through the upper spool section 62 of the spool 14. The shaft 48 of the locking pin located in the housing 50 is withdrawn or released by means of a split ring 52 and an internal spring 54. The shaft 48 of the locking pin is positioned in alignment with a locking hole 57 in the chain and an aperture 58 in the lower spool section 60 of the spool so that the shaft may be positioned in the aperture 58 to fasten the chain 16 in a fixed position as shown in FIGS. 2 and 9. The spring 54 biases the shaft 48 of the locking means 18 into an engaging condition in which it is received into the aperture 58.

In order to release the chain 16 between the stored and extended conditions, the ring 52 is placed over the attachment means in the form of a hook 51. In this way, the locking means 18 is permanently held in a position such that the chain 16 may be extended or returned to the stored condition.

As can be seen from the drawings, the tethering device 10 is positioned ready for use in the following way.

Firstly, the lower section 32 of the support member 12 is driven into the ground by lowering the upper section 30. In this way the upper striking surface 40 strikes the upper face 36 thereby applying a downward force to the lower section 32. This action is continued until the stake 20 of the lower section 32 is positioned in the ground.

The spool 14 with chain 16 is mounted on the support member 12. The receptacle 44 is then positioned on the support member, positioned at an appropriate height and secured by adjusting the twist nut 46. The receptacle 44 is filled with food and/or water as necessary.

The locking pin 18 is withdrawn from the aperture 58 so that the chain 16 may be unwound from the stored condition. The locking pin 18 is then positioned in the aperture 58 so as to provide a length of chain of the appropriate length for tethering the animal. The animal is then attached to the device by means of the clasp 28 which can be clamped to a collar on the animal.

To disassemble the device, the receptacle 44 and spool 14 (with the chain fully wound onto it) are slidably removed from the support member 12. The support member may then be removed from the ground with a reverse action to that of positioning the support member in the ground. That is, the upper section 30 is raised so that the lower striking surface 42 impacts the lower face 38 to provide an uplifting force. This action is continued until the stake is removed from the ground.

As will be noted, the rotation of the rotatable member about the support member prevents or at least partly prevents tangling of the tether line. The rotatable mounting of the upper section of the support member on the lower section further assists in preventing tangling of the line. Furthermore and as noted above, the guard means assists in preventing tangling of the line about the locking means.

Whilst the embodiment has been described for the tethering animals, it should be appreciated that the invention is not limited thereto and can be used in other areas such as for the tethering of boats to the seashore or river bank.

Throughout the specification, unless the context requires otherwise, the word "comprise" or variations such as "comprises" or "comprising", will be understood to imply the inclusion of a stated integer or group of integers but not the exclusion of any other integer or group of integers.

The claims defining the invention are as follows:

1. A tethering device comprising;
    a support member having an upper section and a lower section, the upper section being slidably mounted on the lower section and arranged to reciprocate with respect to the lower section to impart a driving force to the lower section for either driving the lower section into the ground or extracting the lower section from the ground,
    a bowl-shaped receptacle mountable on the upper section of the support member, wherein the receptacle is provided with an adjusting means to allow for raising or lowering of the receptacle on the support member, and
    a rotatable member rotatable about the support member, and a flexible tether line for tethering an animal or object to the support member, the flexible tether line being windable about the rotatable member.

2. A tethering device according to claim 1 wherein the rotatable member includes a collar which abuts the receptacle to retain the rotatable member at a distance away from the receptacle.

3. A tethering device according to claim 1 wherein the flexible tether line is provided with one or more apertures along the length of the flexible tether line, the one or more apertures being arranged to engage the flexible tether line to prevent unwinding thereof from the rotatable member.

4. A tethering device according to claim 3 wherein the device comprises a limiting means mounted on the rotatable member for limiting the length of the flexible tether line unwound from the rotatable member, wherein the limiting means is in the form of a locking means, and the locking means is adapted to be located in one of the apertures to secure the flexible tether line to the rotatable member.

5. A tethering device according to claim 4 wherein the rotatable member is provided with at least one opening in which the limiting means may reside.

6. A tethering device according to claim 4 further comprising an attachment means for securing the limiting means during unwinding of the flexible tether line.

7. A tethering device according to claim 6 wherein the attachment means is a hook for securing a portion of the limiting means.

8. A tethering device according to claim 4 wherein the flexible tether line comprises a chain wherein the links of the chain define the apertures.

9. A tethering device according to claim 4, wherein the device comprises a guard means in association with the locking means.

10. A tethering device according to claim 1 wherein the lower section incorporates a head and the upper section includes upper and lower striking surfaces on opposed sides of the head.

11. A tethering device according to claim 10 wherein the head comprises an upper face and a lower face, the body of the head being tapered towards the upper face and towards the lower face.

12. A tethering device according to claim 10 wherein the lower section comprises an upper part and a lower part, the upper part comprising the head, with an upper face and a lower face on opposed sides of the head, and the lower part comprising a stake section.

13. A tethering device according to claim 12 wherein the stake section comprises a shank and a pointed section at one end of the shank for location in the ground.

14. A tethering device according to claim 1 wherein the upper section comprises a first section, a second section and an intermediate section located between the first section and the second section, the first section being located at an end of the upper section remote from the lower section of the support member.

15. A tethering device according to claim 14 wherein the second section is of heavier mass than the first section.

16. A tethering device according to claim 1 wherein the upper section of the support member is slidably and rotatably mounted on the lower section of the support member.

17. A tethering device comprising:
a support member having an upper section and a lower section, the upper section being slidably mounted on the lower section and arranged to reciprocate with respect to the lower section to impart a driving force to the lower section for either driving the lower section into the ground or extracting the lower section from the ground; and
a rotatable member rotatable about the support member and about which a flexible tether line can be wound for tethering an animal or object to the support member;
wherein the tethering device includes a bowl-shaped receptacle mountable on the support member;
wherein the receptacle is mounted on the upper portion of the support member; and
wherein the rotatable member includes a collar which abuts the receptacle to retain the rotatable member at a distance away from the receptacle.

18. A tethering device comprising:
a support member having an upper section and a lower section, the upper section being slidably mounted on the lower section and arranged to reciprocate with respect to the lower section to impart a driving force to the lower section for either driving the lower section into the ground or extracting the lower section from the ground; and
a rotatable member rotatable about the support member and about which a flexible tether line can be wound for tethering an animal or object to the support member;
wherein the device comprises a limiting means for limiting the length of the flexible member unwound from the rotatable member;
wherein the limiting means is mounted on the rotatable member; and
wherein the rotatable member is provided with at least one opening in which the limiting means may reside.

19. A tethering device comprising:
a support member having an upper section and a lower section, the upper section being slidably mounted on the lower section and arranged to reciprocate with respect to the lower section to impart a driving force to the lower section for either driving the lower section into the ground or extracting the lower section from the ground: and
a rotatable member rotatable about the support member and about which a flexible tether line can be wound for tethering an animal or object to the support member;
wherein the device comprises a limiting means for limiting the length of the flexible member unwound from the rotatable member;
wherein the limiting means is in the form of a locking means; and
wherein the device comprises a guard means in association with the locking means.

20. A tethering device comprising:
a support member having an upper section and a lower section, the upper section being slidably mounted on the lower section and arranged to reciprocate with respect to the lower section to impart a driving force to the lower section for either driving the lower section into the ground or extracting the lower section from the ground; and
a rotatable member rotatable about the support member and about which a flexible tether line can be wound for tethering an animal or object to the support member;
wherein the tether line is provided with at least one aperture which can engage the flexible member to prevent unwinding thereof from the rotatable member;
wherein the tether line is provided with multiple apertures along the length of the line to form locking holes; and
wherein locking means is adapted to be located in one of the locking holes to secure the tether line to the rotatable member.

* * * * *